W. J. KENRICK.
MOTOR VEHICLE.
APPLICATION FILED JULY 10, 1916.
1,293,796.
Patented Feb. 11, 1919.
2 SHEETS—SHEET 2.
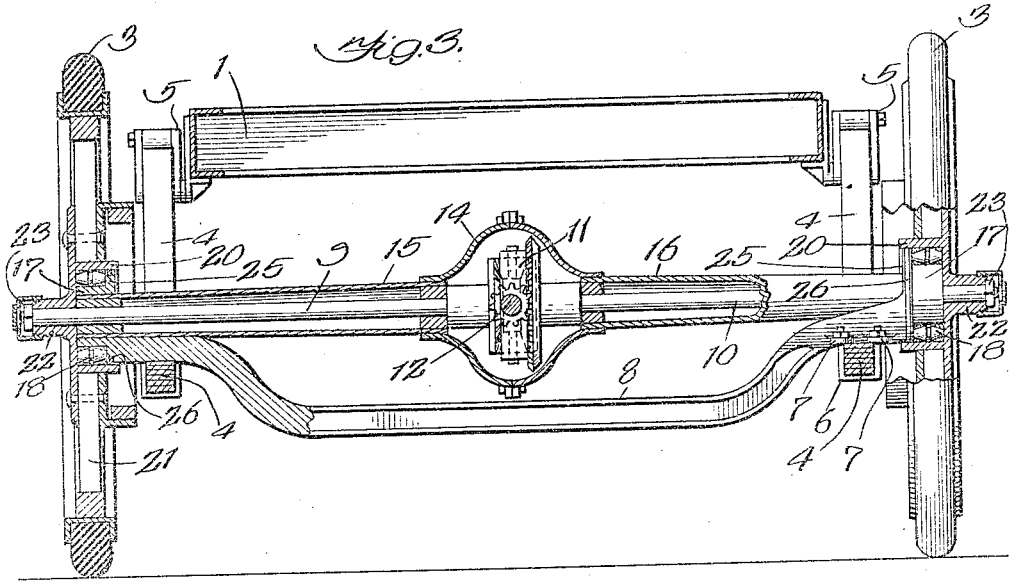
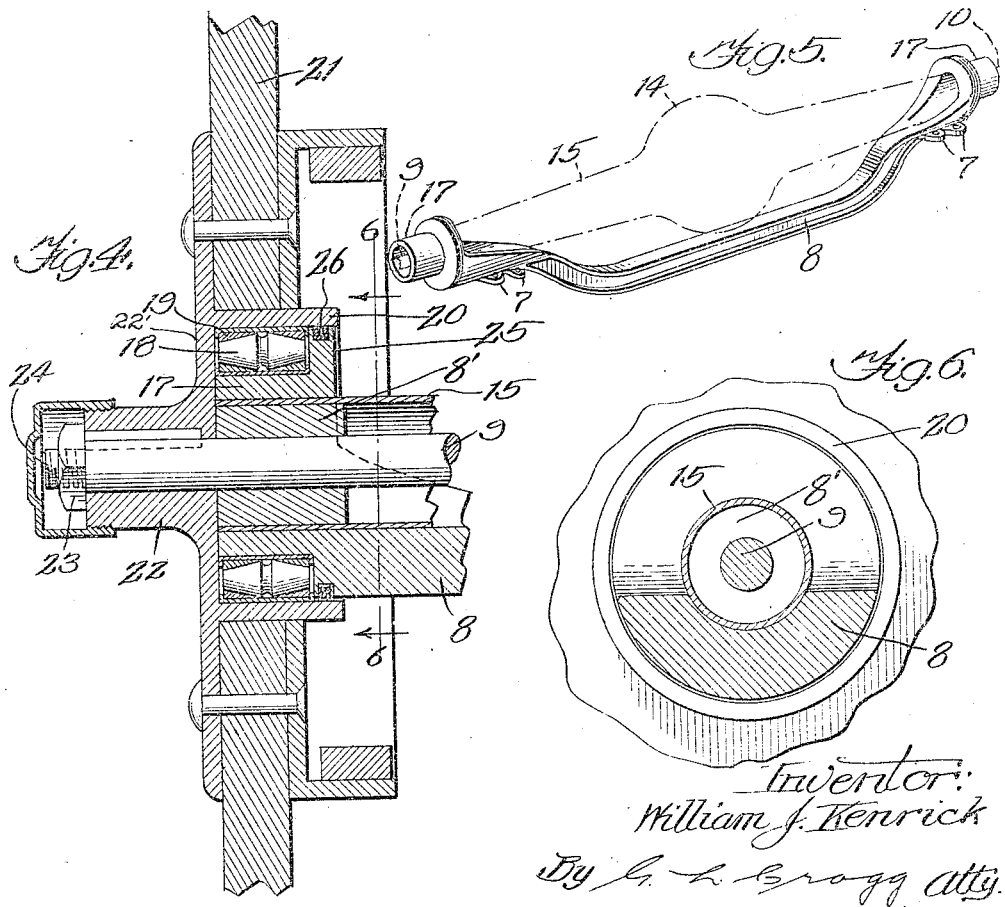
Inventor:
William J. Kenrick
By G. L. Gragg Atty.

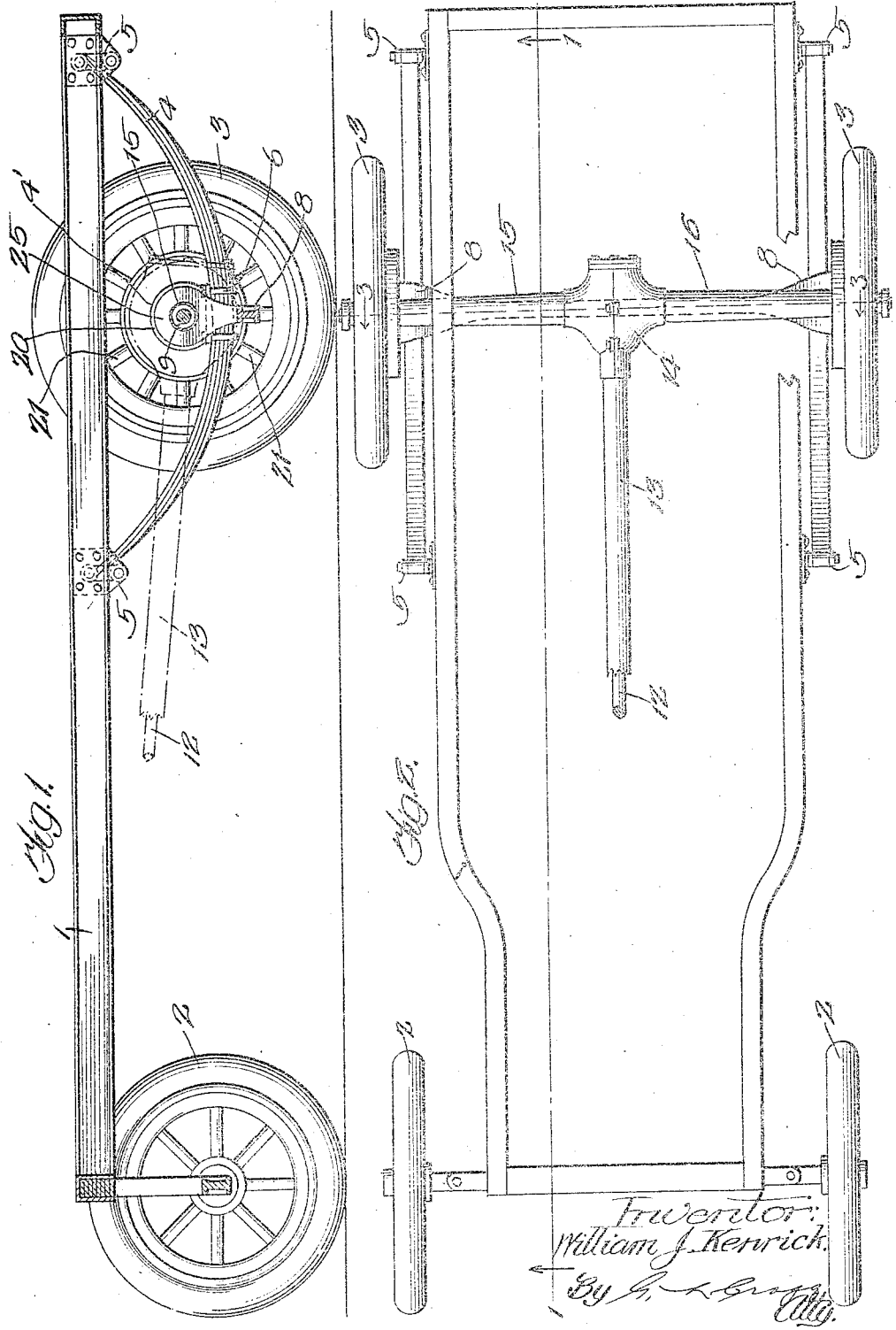

UNITED STATES PATENT OFFICE.

WILLIAM J. KENRICK, OF CHICAGO, ILLINOIS.

MOTOR-VEHICLE.

1,293,796. Specification of Letters Patent. Patented Feb. 11, 1919.

Application filed July 10, 1916. Serial No. 108,358.

*To all whom it may concern:*

Be it known that I, WILLIAM J. KENRICK, a citizen of the United States, residing at Chicago, in the county of Cook and State of Illinois, have invented a certain new and useful Improvement in Motor-Vehicles, of which the following is a full, clear, concise, and exact description, reference being had to the accompanying drawings, forming a part of this specification.

My invention relates to motor vehicles employing live axles that are divided into differentially coupled sections and has for its object the provision of an improved construction for establishing the assembly between the propelling motor vehicle wheels of a motor vehicle, the sections of the live axle respectively individual to these wheels, and the dead axle which is employed to maintain the alinement of the sections of the live axle.

I will explain my invention more fully by reference to the accompanying drawings showing the preferred embodiment thereof and in which Figure 1 is a view in elevation, taken partially in section on line 1—1 of Fig. 2, showing the frame and part of the running gear of an automobile; Fig. 2 is a plan view of parts illustrated in Fig. 1; Fig. 3 is a rear sectional elevation on line 3—3 of Fig. 2; Fig. 4 is a view on a larger scale of a part of the structure shown in Fig. 3; Fig. 5 is a perspective view illustrating novel features of the invention; and Fig. 6 is a view on line 6—6 of Fig. 4.

Like parts are indicated by similar characters of reference throughout the different figures.

The forward end of the automobile or motor vehicle frame 1 is supported in any usual or suitable way upon the front vehicle wheels 2, and upon the rear propelling vehicle wheels 3 by means of springs 4 that are coupled with the frame by means of shackles 5. The middle portions of the springs 4 are embraced by U-bolts 6 whose ends are passed through bolting lugs 7 projecting forwardly and rearwardly from the ends of the dead axle 8. The live axle is formed of independently rotatable sections 9, 10 that are coupled by differential gearing 11, this gearing being operated in any usual or preferred manner by means of the power transmitting shaft 12 that is connected with the internal combustion engine or other motor of the automobile power plant. The shaft 12 passes through a tubular housing element 13 that is connected with the gear case or housing 14 which, in turn, is connected with the tubular housing portions 15, 16 that surround the live axle sections 9 and 10. The outer ends of the live axle sections 9 and 10 pass through filler sleeves $8^1$ that are tightly received in the outer ends of the housing sections 15, 16 which in turn are tightly received within annular collars 17 in which the dead axle terminates, the intermediate portion of the dead axle being depressed out of line with these collars to accommodate the gear casing 14. These collars support inner raceways of roller bearing structures whose rollers 18 support the propelling vehicle wheels 3 through the intermediation of outer raceways 19 that are carried by the hubs 20 of said wheels. These rollers may be spherical or elongated, tapering elongated rollers being preferred. The hubs 20 are shown as being separately formed from the spokes 21 though any formation that is preferred may be employed. Said hubs are outwardly extended at 22, the outer ends of the live axle sections 9, 10 passing through the collars 17 and being coupled with the extensions 22 of the hubs by means of nuts 23 threaded upon the threaded extension 24 of said live axle sections. The collars 17 are provided with inner flanges 25 which support annular bodies of packing 26 to render the annular spaces in which the rollers 18 travel dust proof and to prevent leakage of lubricant from such spaces, the packing engaging the inner ends of the hubs 20 as clearly illustrated in Fig. 4.

It will be observed that the main horizontal annular hub portion 20 of the hub of each propelling vehicle wheel is in the plane of the rim of such wheel and that this hub portion is joined by an upright web hub portion 22' with the outer horizontal hub extension 22 at the outer side of the corresponding wheel. Said web hub portion 22' and the main horizontal annular hub portion 20 respectively constitute the outer upright wall and the outer horizontal annular wall of an annular bearing receiving recess, one such recess pertaining to each propelling vehicle wheel to receive a roller bearing structure upon which such wheel turns. The horizontal collar 17 at each end of the dead axle enters the hub of the adjacent propelling vehicle wheel where it is located in the plane of the rim of this wheel. This collar forms the inner horizontal wall of the bearing receiving recess pertaining to the wheel that surrounds this collar. The flange 25 of each collar is upon the inner side of the adjacent propelling vehicle wheel and forms the inner upright wall, which is the remaining wall, of the bearing receiving recess pertaining to the corresponding vehicle wheel. The roller bearings 18 are disposed in the bearing receiving recesses and are supported upon the collars at the outer ends of the dead axle.

The dead axle 8, carrying as it does the bearings for the driving vehicle wheels, performs the function of supporting these wheels upon a common axis and in parallel planes of rotation and the dead axle is desirably made so strong that these functions may be disregarded in the design of the housing for the live axle. Such housing may also be relieved of direct connection with the rear vehicle springs 4 and these springs may be made considerably larger by being connected beneath the dead axle materially below the housing for the live axle. The housing that is provided for the differential gearing and the sections of the live axle serves to hold lubricant and, by being in fixed connection with the outer ends of the dead axle, serves to maintain the differential gearing and the sections of the live axle connected therewith in proper position.

While I have herein shown and particularly described the preferred embodiment of my invention I do not wish to be limited to the precise details of construction shown as changes may readily be made without departing from the spirit of my invention but having thus described my invention I claim as new and desire to secure by Letters Patent the following:—

A motor vehicle including two propelling vehicle wheels each having a main horizontal annular hub portion that is in the plane of its rim, an outer horizontal hub extension, and an upright web hub portion joining the other two hub portions at the outer side of the wheel, said web hub portion and the main horizontal annular hub portion respectively constituting the outer upright wall and the outer horizontal annular wall of an annular bearing receiving recess, one such recess pertaining to each propelling vehicle wheel; a live axle divided into sections that are respectively individual to said propelling vehicle wheels, the outer end of each live axle section being secured to the outer extension of the hub of the wheel to which this live axle section is individual; differential gearing uniting the sections of said live axle; a dead axle provided at each of its ends with a horizontal collar through which a live axle section extends and which collar enters the hub of the adjacent propelling vehicle wheel and is disposed in the plane of the rim of this wheel and forms the inner horizontal annular wall of the bearing receiving recess pertaining to this wheel, each collar having a flange upon the inner side of the adjacent propelling vehicle wheel and which flange forms the inner upright wall, which is the remaining wall, of the bearing receiving recess pertaining to this wheel; and roller bearings disposed in the bearing receiving recesses.

In witness whereof, I hereunto subscribe my name this 13th day of June A. D., 1916.

WILLIAM J. KENRICK.

Witnesses:
G. L. CRAGG,
E. L. WHITE.

Copies of this patent may be obtained for five cents each, by addressing the "Commissioner of Patents, Washington, D. C."